United States Patent Office 3,220,218
Patented Nov. 30, 1965

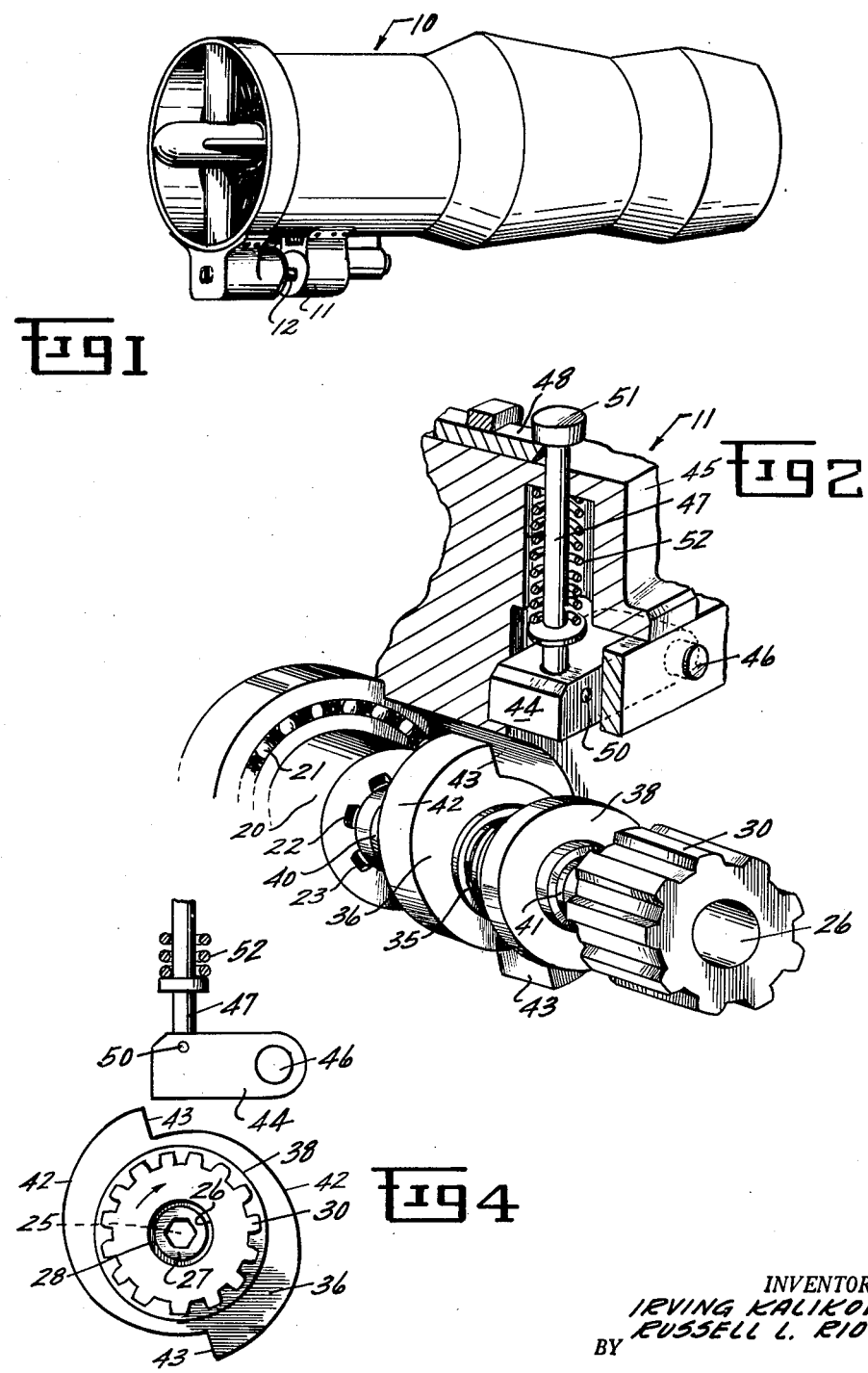

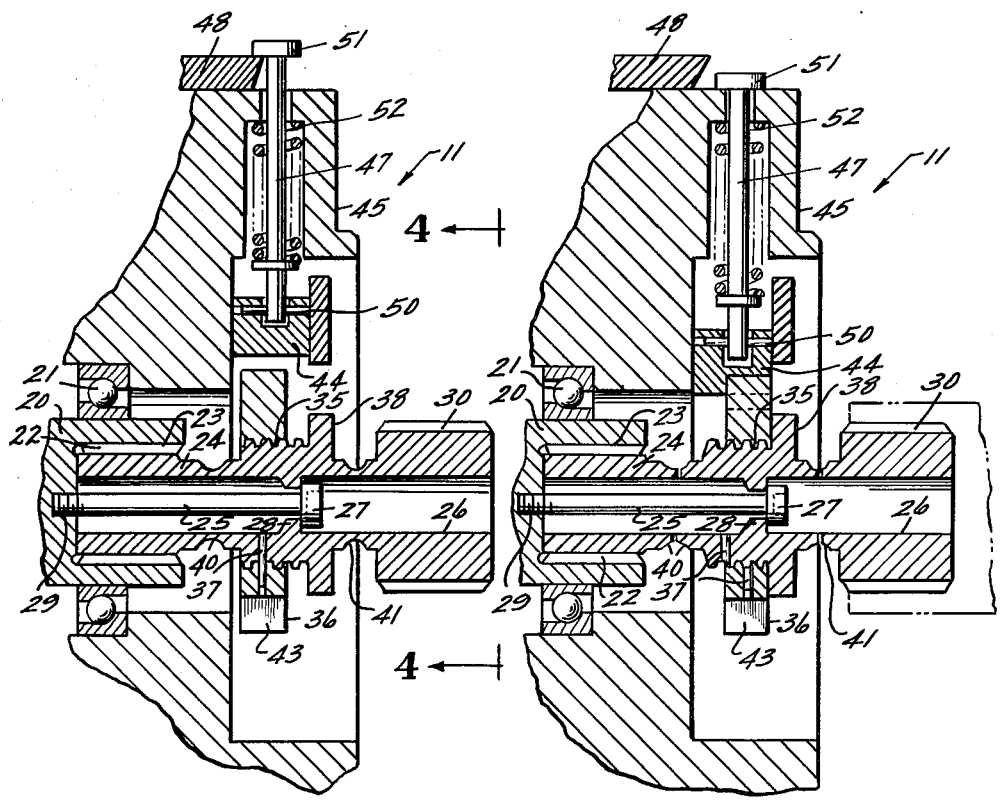

3,220,218
DEVICE FOR DISCONNECTING ENGINE DRIVEN AIRCRAFT ACCESSORIES
Russell Lewis Rio, Lynn, and Irving Kalikow, Swampscott, Mass., assignors to General Electric Company, a corporation of New York
Filed Dec. 30, 1963, Ser. No. 334,443
9 Claims. (Cl. 64—28)

This invention relates to shaft disconnect devices and, more particularly, to an arrangement for quickly and reliably disconnecting an engine driven aircraft accessory from the engine in the event of an accessory malfunction.

Aircraft engine accessories such as elecric generators and hydraulic drives are driven at high speeds by the engine. Various malfunctions, including failure of a bearing, loss of either lubricating or cooling fluid, and damage to electrical wiring, can cause severe overheating and other damage to the engine and the aircraft. To ensure against loss of the engine and aircraft due to fire or other damage resulting from an accessory malfunction, means of disconnecting the accessory drive shaft from the engine is required. Various disconnect devices have been proposed and used in the past. These disconnect devices range from complex clutches and similar devices that disengage coupling splines or gears to simple shaft shear sections that separate at predetermined overload torques. The complex disconnect is often undesirably heavy and bulky for aircraft applications, and its cost to install on all accessories to protect against the few that fail may be economically excessive. Furthermore, alignment and lubrication problems may be associated with the complex device, and its reliability may be adversely affected by wear or failure of its components. Simple shear sections, while being lightweight and inexpensive, are usually too unreliable for practical use since the torque during accessory failure is usually far below the torque experienced during cold starts and under other normal high torque conditions. By the time the failure torque exceeds the maximum design torque, if in fact it ever does, a fire may be started or other damage may already be done to the engine or aircraft.

It is therefore a primary object of this invention to provide an improved disconnect device for quickly and reliably disconnecting an aircraft accessory from the engine power take-off in the event of impending failure.

Another object of this invention is to provide a reliable shaft disconnect which is lightweight and relatively inexpensive.

A further object is to provide a simple shaft disconnect device not subject to wear, lubrication, and alignment problems.

A still further object of this invention is to provide a compact, lightweight, and low cost disconnect device for quickly and reliably disconnecting an aircraft accessory from the engine power take-off, the disconnect device being capable of successful disconnect action over a broad range of torque levels.

Briefly stated, in accordance with an illustrated embodiment of the invention, a driven load such as an aircraft accessory is connected to the engine by a rotatably mounted shaft. The shaft is externally threaded, and an internally threaded nut is mounted on the threaded shaft portion in a normally fixed position relative to the shaft. A radial shoulder is provided at one end of the threaded shaft portion in axially spaced relation to the normally fixed position of the nut. A lock is selectively movable by suitable actuating means between a retracted position and an extended position. As the lock is moved into its extended position, it engages a cam surface on the outer periphery of the nut and prevents further rotation of the nut with the shaft. Continued rotation of the shaft causes the nut to move axially along the threaded shaft portion until is contacts the radial shoulder. This engagement generates a stopping torque on the shaft which is greater than the maximum torque transmitting capability of a reduced strength shaft portion, which thus fractures and disconnects the load from the engine. The torque transmitting capability of the reduced strength shaft portion is, however, substantially greater than the maximum design torque required by the load. In this manner, selective operation of the actuating means causes failure of shaft and thereby disconnects the load.

While the invention is distinctly claimed and particularly pointed out in the claims appended hereto, the invention, both as to organization and content, will be better understood and appreciated, along with other objects and features thereof, from the following detailed description when taken in conjunction wtih the drawing, in which:

FIG. 1 is a pictorial illustration of an aircraft engine having an engine driven accessory mounted hereon;

FIG. 2 is a pictorial view partially cut away of the accessory showing the shaft disconnect device of this invention;

FIG. 3 is a cross-sectional view of the shaft disconnect device of FIG. 2;

FIG. 4 is a view taken along line 4—4 of FIG. 3; and

FIG. 5 is a view similar to FIG. 3 showing the shaft disconnect device after failure of the shaft has occurred.

Referring first to FIG. 1, an aircraft gas turbine engine 10 having an accessory 11 such as a generator or hydraulic drive mounted thereon is illustrated. The accessory 11 is driven by a power output shaft 12 from the engine 10. In order to protect the engine 10 and the aircraft in which the engine is mounted, the accessory 11 is equipped with the shaft disconnect device of this invention, an embodiment of the device being illustrated by FIGS. 2–5. Before proceeding with a detailed description of the illustrated embodiment, it is pointed out that the device can be used wherever it is desired to provide a shaft disconnect arrangement. Thus, the invention can be used in non-aircraft application, and it can be used in conjunction with other types of driving members such as, for example, reciprocating internal combustion engines, steam turbines, and electric motors. Since the invention has particular utility in aircraft applications, however, it has been deemed appropriate to describe the shaft disconnect in that context.

Turning now to FIGS. 2–5, the accessory 11 has a power input shaft 20 rotatably mounted in a bearing 21. The input shaft 20 has internal splines 22 which mesh with external splines 23 on a stub shaft 24. The splines 22 and 23 are held in meshing engagement by a bolt 25 located in an axial bore 26 in the stub shaft 24. The head 27 of the bolt 25 contacts a radial shoulder 28 in the bore 26, and the other end of the bolt 25 has a threaded portion 29 which is received in a tapped hole in the input shaft 20. The other end of the stub shaft has external splines 30 for mating with splines (not illustrated) on the engine output shaft.

Intermediate the splined ends, the stub shaft 24 has a threaded portion 35 upon which a threaded nut 36 is mounted in a normally fixed position relative to the shaft 24. FIGS. 2 and 3 illustrate the nut 36 in its normally fixed position. As shown by FIG. 3, a radial shear pin 37 extends through the stub shaft 24 and the nut 36 to hold the nut 36 in the fixed position. A radial shoulder 38 extends outwardly from the shaft 24 at one end of the threaded portion 35, the shoulder 38 being spaced axially from the nut 36 when the nut is in its fixed position.

There is a precise relationship between the direction of the threads on the shaft 24 and the nut 36 and the location of the radial shoulder 38. Assuming for a moment that the nut 36 is free to turn on the threaded portion 35 and that the engine is driving the stub shaft 24 in its normal driving direction, the threads and the shoulder 38 are disposed such that restraint of the nut 36 against rotation will cause the nut 36 to move axially along the threaded portion 35 into engagement with the shoulder 38.

As best shown by FIG. 3, the stub shaft 24 has reduced diameter shear sections 40 and 41, section 40 being located intermediate the threaded portion 35 and the splines 23 and section 41 being located intermediate the shoulder 38 and the splines 30. These relatively thin walled shear sections have strength sufficient to transmit the maximum torque levels which may occur during normal operation of the accessory. There is thus no possibility that the stub shaft 24 will fail during cold starts or under other normal high torque conditions.

Referring now to FIGS. 2 and 4, the nut 36 has a cammed outer surface having a configuration similar to that of a ratchet wheel. In particular, the cammed surface is comprised of two smooth surfaces 42 of gradually varying radius and two radial steps or teeth 43. A pawl 44 is pivotally mounted to the accessory casing 45 by a shaft 46, and the pawl 44 is held in the position illustrated in FIGS. 2-4 by an actuating rod 47 and a latch 48. More precisely, the actuating rod 47 is connected to the pawl 44 by a pin 50 and has an enlarged head portion 51 at its upper end. The latch 48 extends under the head portion 51 to hold the actuating rod 47 and the pawl 44 in the illustrated positions. A spring 52 urges the actuating rod 47 and the pawl 44 in a downward direction and thus holds the head 51 in contact with the latch 48.

It will be obvious that movement of the latch 48 to the left as viewed in FIG. 3 permits the spring 52 to move the actuating rod 47 downward and pivot the pawl 44 about the shaft 46 into a locking position in which the pawl 44 engages one of the radial steps or teeth 43 on the nut 36 and prevents further rotation of the nut 36, the normal direction of rotation being shown by the arrow on FIG. 4. It will be seen that the pawl 44 is actually a lock for preventing rotation of the nut 36.

The operation of the shaft disconnect device will now be described. During normal operation, the accessory 11 is driven through the stub shaft 24 by the engine output shaft 12. If in the event of an accessory malfunction or if for any other reason it is desired to disconnect the accessory 11 from the engine 10, the pilot causes the latch 48 to be moved to the left as viewed in FIG. 3. This can be accomplished by any suitable actuating means such as a manually operated mechanical linkage, a lanyard, an electrical solenoid, an explosive squib, or a hydraulic or pneumatic actuator. This movement of the latch 48 releases the head portion 51 of the actuating rod 47 and permits the spring 52 to move the pawl 44 into contact with the cammed surface of the nut 36. Until this occurs, the nut 36 is held by shear pin 37 in its normally fixed position relative to the stub shaft 24 and therefore rotates with the stub shaft. When the lock or pawl 44 strikes one of the radial steps 43, however, the torque exerted on the nut 36 shears the pin 37. With the pawl 44 restraining the nut 36 against further rotation, the nut 36 moves axially along the threaded portion 35 of the shaft until it abuts the radial shoulder 38. At this point, the nut 36 is restrained against both rotation and axial translation along the stub shaft 24. Consequently, the nut 36 exerts a substantial stopping torque on the shaft, the stopping torque being greater than both the maximum design torque and the torque transmitting capability of the reduced strength shear sections 40 and 41. As a result, the shaft fractures at one and generally both of the shear sections 40 and 41. Accessory inertia fractures one of the shear sections, and engine rotation fractures the other. FIG. 5 illustrates the arrangement of the various elements at failure. In particular, it will be noted that the pawl 44 is in locking engagement with the nut 36, that the pin 37 has sheared, that the nut 36 has moved along the threaded portion 35 into contact with the radial shoulder 38, and that the stub shaft 24 has fractured at the reduced strength shear section 40.

Throughout this description, the actuating rod 47 and the pawl 44 have been described as moving downward to contact the nut 36. It will be obvious, however, that the arrangement is not dependent upon any particular attitude of the elements since the spring 52 will positively urge the pawl 44 into contact with the nut 36 at any attitude. Therefore, words such as "upward," "downward," "to the left," etc., should be recognized as referring to the relative positions of the elements as illustrated and not to any actual position in space during operation.

The stub shaft 24 can be removed easily after failure and replaced by an unfractured, relatively inexpensive replacement shaft. If desired, however, the stub shaft can be eliminated, and the shaft disconnect arrangement of this invention can be associated with the accessory input shaft. Other changes and modifications will occur to those skilled in the art. For example, the continuous screw threads on the threaded portion 35 of the stub shaft and in the nut can be replaced by a plurality of helical grooves to produce the same end result.

From the foregoing, it will be appreciated that the shaft disconnect device of this invention is capable of quickly and reliably disconnecting the accessory from the engine in the event of impending failure. Furthermore, the lightweight and relatively inexpensive shaft disconnect is capable of successful disconnect action over a broad range of torque levels.

It will be understood that the invention is not limited to the specific details of construction and arrangement of the embodiment illustrated and described herein since, as observed previously, changes and modifications will be obvious to those skilled in the art. It is therefore intended to cover in the appended claims all such changes and modifications which may occur to those skilled in the art without departing from the true spirit and scope of the invention.

What is claimed as new and desired to secure by Letters Patent of the United States is:

1. For disconnecting a driven member from a driving member, a shaft disconnect device comprising:
    (a) a rotatably mounted shaft connecting the driving member to the driven member for transmitting torque therebetween,
    (b) helical guide means on the surface of said shaft,
    (c) a stop at one end of said helical guide means,
    (d) a nut mounted on said helical guide means in a normally fixed position relative to said shaft in which said nut is spaced axially from said stop,
    (e) a lock movable between retracted and extended positions, said lock in said extended position engaging said nut to prevent rotation of said nut with said shaft and thereby force said nut axially along said helical guide means, said helical guide means and said stop disposed such that said nut is moved into contact with said stop by said lock when the shaft is rotating in its normal driving direction,
    (f) an actuator for selectively moving said lock from its retracted position to its extended position in which said lock engages said nut,
    (g) and a reduced strength shaft portion having torque transmitting capability greater than the maximum design torque required by the driven member and less than the torque generated when said nut is forced into contact with said stop by said lock,
    (h) whereby selective operation of said actuator results in torque sufficient to cause failure of said shaft at said reduced strength shaft portion and thereby disconnects the driven member from the driving member.

2. For disconnecting a driven member from a driving member, a shaft disconnect device comprising:
   (a) a rotatably mounted shaft connecting the driving member to the driven member for transmitting torque therebetween,
   (b) an external threaded surface on said shaft,
   (c) a radially extending shoulder at one end of said threaded surface,
   (d) an internally threaded nut received on the external threaded surface of said shaft, said nut mounted in a normally fixed position relative to said shaft in which said nut is spaced axially from said shoulder,
   (e) a cam surface on the outer periphery of said nut,
   (f) a lock movable between retracted and extended positions, said lock in said extended position engaging said cam surface to prevent rotation of said nut with said shaft and thereby force said nut axially along said threaded surface, the threads and said shoulder disposed such that said nut is moved into contact with said shoulder by said lock when the shaft is rotating in its normal driving direction,
   (g) an actuator for selectively moving said lock from its retracted position to its extended position in which said lock engages said cam surface.
   (h) and a reduced strength shaft portion having torque transmitting capability greater than the maximum design torque required by the driven member and less than the torque generated when said nut is forced into contact with said shoulder by said lock,
   (i) whereby selective operation of said actuator results in torque sufficient to cause failure of said shaft at said reduced strength shaft portion and thereby disconnects the driven member from the driving member.

3. In a shaft disconnect device as claimed in claim 2, means holding said nut in said normally fixed position relative to said shaft, said holding means releasing said nut to permit axial movement of said nut along said threaded surface when said lock is moved to its extended position.

4. In a shaft disconnect device as claimed in claim 2, a radial pin connecting said shaft and said nut to hold said nut in said normally fixed position relative to said shaft, said pin shearing to permit axial movement of said nut along said threaded surface when said lock is moved to its extended position.

5. For disconnecting a driven member from a driving member, a shaft disconnect device comprising:
   (a) a rotatably mounted shaft connecting the driving member to the driven member for transmitting torque therebetween,
   (b) an external threaded surface on said shaft,
   (c) a radially extending shoulder at one end of said threaded surface,
   (d) an internally threaded nut received on the external threaded surface of said shaft, said nut mounted in a normally fixed position relative to said shaft in which said nut is spaced axially from said shoulder,
   (e) a cam surface on the outer periphery of said nut,
   (f) a pivotally mounted lock movable between retracted and extended positions, said lock in said extended position engaging said cam surface to prevent rotation of said nut with said shaft and thereby force said nut axially along said threaded surface, the threads and said shoulder disposed such that said nut is moved into contact with said shoulder by said lock when the shaft is rotating in its normal driving direction,
   (g) an actuating rod mounted for reciprocation and pivotally connected to said lock for moving with said lock between said retracted and extended position,
   (h) spring means connected to said actuating rod urging said rod and said lock to said extended position,
   (i) a latch selectively movable between first and second positions, said latch in said first position engaging said actuating rod to hold said rod and said lock in said retracted position and in said second position releasing said rod to permit said spring means to move said rod and said lock to said extended position,
   (j) and a reduced strength shaft portion having torque transmitting capability greater than the maximum design torque required by the driven member and less than the torque generated when said nut is forced into contact with said shoulder by said lock,
   (k) whereby selective movement of said latch to said second position results in torque sufficient to cause failure of said shaft at said reduced strength shaft portion and thereby disconnects the driven member from the driving member.

6. In a shaft disconnect device as claimed in claim 5, a radial pin connecting said shaft and said nut to hold said nut in said normally fixed position relative to said shaft, said pin shearing to permit axial movement of said nut along said threaded surface when said lock is moved to its extended position.

7. For disconnecting an engine driven aircraft accessory from the engine, a shaft disconnect device comprising:
   (a) a rotatably mounted stub shaft having connecting means at the ends of said stub shaft for drivingly connecting said stub shaft to the output shaft of the engine and the input shaft of the accessory such that said shaft transmits torque therebetween,
   (b) an external threaded surface on said stub shaft,
   (c) a radially extending shoulder at one end of said threaded surface,
   (d) an internally threaded nut received on the external threaded surface of said stub shaft, said nut mounted in a normally fixed position relative to said stub shaft in which said nut is spaced axially from said shoulder,
   (e) a cam surface on the outer periphery of said nut,
   (f) a lock movable between retracted and extended positions, said lock in said extended position engaging said cam surface to prevent rotation of said nut with said stub shaft and thereby force said nut axially along said threaded surface, the threads and said shoulder disposed such that said nut is moved into contact with said shoulder by said lock when the stub shaft is rotating in its normal driving direction,
   (g) an actuator for selectively moving said lock from its retracted position to its extended position in which said lock engages said cam surface,
   (h) and a reduced strength shaft portion having torque transmitting capability greater than the maximum design torque required by the load and less than the torque generated when said nut is forced into contact with said shoulder by said lock,
   (i) whereby selective operation of said actuator results in torque sufficient to cause failure of said stub shaft at said reduced strength shaft portion and thereby disconnects the accessory from the engine.

8. For disconnecting an engine driven aircraft accessory from the engine, a shaft disconnect device comprising:
   (a) a rotatably mounted stub shaft having connecting means at the ends of said stub shaft for drivingly connecting said stub shaft to the output shaft of the engine and the input shaft of the accessory such that said shaft transmits torque therebetween,
   (b) an external threaded surface on said stub shaft,
   (c) a radially extending shoulder at one end of said threaded surface,
   (d) an internally threaded nut received on the external threaded surface of said stub shaft, said nut mounted in a normally fixed position relative to said stub shaft in which said nut is spaced axially from said shoulder,
   (e) a cam surface on the outer periphery of said nut,
   (f) a pivotally mounted lock movable between retracted and extended position engaging said cam surface to prevent rotation of said nut with said stub shaft and thereby force said nut axially along said threaded surface, the threads and said shoulder disposed such that said nut is moved into contact with said shoulder by said lock when the stub shaft is rotating in its normal driving direction.

(g) an actuating rod mounted for reciprocation and pivotally connected to said lock for moving with said lock between said retracted and extended positions, (h) spring means connected to said actuating rod urging said rod and said lock to said extended position, (i) a latch selectively movable between first and second positions, said latch in said first position engaging said actuating rod to hold said rod and said lock in said retracted position and in said second position releasing said rod to permit said spring means to move said rod and said lock to said extended position, (j) and a reduced strength shaft portion having torque transmitting capability greater than the maximum design torque required by the load and less than the torque generated when said nut is forced into contact with said shoulder by said lock.

(k) whereby selective movement of said latch to said second position results in torque sufficient to cause failure of said stub shaft at said reduced strength shaft portion and thereby disconnects the accessory from the engine.

9. In a shaft disconnect device as claimed in claim 8, a radial pin connecting said stub shaft and said nut to hold said nut in said normally fixed position relative to said shaft, said pin shearing to permit axial movement of said nut along said threaded surface when said lock is moved to its extended position.

References Cited by the Examiner

UNITED STATES PATENTS

| | | | |
|---|---|---|---|
| 2,509,813 | 5/1950 | Dineen | 192—101 |
| 2,802,555 | 8/1957 | Kalikow | 192—24 |
| 2,862,375 | 12/1958 | Miller | 64—28 |
| 3,124,361 | 3/1964 | Haberland et al. | 64—28 X |
| 3,126,723 | 3/1964 | Dugay | 64—28 |

BROUGHTON G. DURHAM, *Primary Examiner.*

DON A. WAITE, *Examiner.*